(12) United States Patent
Takamatsu

(10) Patent No.: US 10,539,778 B2
(45) Date of Patent: Jan. 21, 2020

(54) ROTOR UNIT, ROTOR, AND PROJECTOR

(71) Applicant: SONY CORPORATION, Tokyo (JP)

(72) Inventor: Takashi Takamatsu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/537,616

(22) PCT Filed: Nov. 18, 2015

(86) PCT No.: PCT/JP2015/005769
§ 371 (c)(1),
(2) Date: Jun. 19, 2017

(87) PCT Pub. No.: WO2016/110888
PCT Pub. Date: Jul. 14, 2016

(65) Prior Publication Data
US 2018/0059403 A1   Mar. 1, 2018

(30) Foreign Application Priority Data

Jan. 7, 2015  (JP) ................. 2015-001367

(51) Int. Cl.
*G02B 26/00* (2006.01)
*G02B 7/00* (2006.01)
(Continued)

(52) U.S. Cl.
CPC .............. *G02B 26/008* (2013.01); *F21V 9/40* (2018.02); *G02B 7/008* (2013.01); *G03B 21/204* (2013.01)

(58) Field of Classification Search
CPC .... G02B 26/008; G02B 7/006; G03B 21/204; F21K 9/64; F21V 5/10; G02F 2001/133614; H01L 33/50
See application file for complete search history.

(56) References Cited

U.S. PATENT DOCUMENTS 6,598,977 B1 * 7/2003 Chen ................... G02B 26/008
348/743
2003/0117590 A1   6/2003 Hunziker et al.
(Continued)

FOREIGN PATENT DOCUMENTS

JP    2003-57424 A    2/2003
JP    2003-337219 A   11/2003
(Continued)

OTHER PUBLICATIONS

International Search Report dated Jan. 19, 2016, in PCT/JP2015/005769, filed Nov. 18, 2015.
(Continued)

*Primary Examiner* — Cara E Rakowski
*Assistant Examiner* — Christopher A Lamb, II
(74) *Attorney, Agent, or Firm* — Oblon, McClelland, Maier & Neustadt, L.L.P.

(57) ABSTRACT

A rotor unit includes a rotor including a substrate and a wavelength conversion region, and a driving unit. The substrate includes an outer edge and is configured such that a substrate material is continuously provided from a center to the outer edge. The wavelength conversion region is provided on the substrate and receives light having a first wavelength region and emits light having a second wavelength region different from the first wavelength region. The driving unit rotates the rotor.

11 Claims, 7 Drawing Sheets

(51) Int. Cl.
*G03B 21/20* (2006.01)
*F21V 9/40* (2018.01)

(56) References Cited

U.S. PATENT DOCUMENTS

| | | | |
|---|---|---|---|
| 2005/0128614 A1* | 6/2005 | Kao | G02B 26/008 |
| | | | 359/892 |
| 2006/0044526 A1* | 3/2006 | Niwa | G02B 26/008 |
| | | | 353/84 |
| 2006/0103813 A1* | 5/2006 | Niwa | G02B 26/008 |
| | | | 353/84 |
| 2006/0126199 A1 | 6/2006 | Jia | |
| 2006/0238909 A1 | 10/2006 | Auell | |
| 2008/0180823 A1* | 7/2008 | Tso | G02B 7/008 |
| | | | 359/892 |
| 2009/0027793 A1* | 1/2009 | Ho | G02B 26/008 |
| | | | 359/892 |
| 2009/0059407 A1 | 3/2009 | Ho et al. | |
| 2014/0354960 A1* | 12/2014 | Miyazaki | H04N 9/3114 |
| | | | 353/84 |

FOREIGN PATENT DOCUMENTS

| | | | |
|---|---|---|---|
| JP | 2003337219 A | * | 11/2003 |
| JP | 2004-197922 A | | 7/2004 |
| JP | 2010-3632 A | | 1/2010 |
| JP | 2011-75657 A | | 4/2011 |
| JP | 2012-8177 A | | 1/2012 |

OTHER PUBLICATIONS

Extended European Search Report dated Aug. 1, 2018 in corresponding European Patent Application No. 15876769.9, 8 pages.
Japanese Office Action issued in Japanese Patent Application No. 2016-568170 dated Sep. 3, 2019 (w/ English Translation).
Chinese Office Action issued in Chinese Patent Application No. 201580071853.7 dated Aug. 2, 2019 (w/ English Translation).

* cited by examiner

ROTOR UNIT, ROTOR, AND PROJECTOR

TECHNICAL FIELD

The present technology relates to a projector, a rotor, and a rotor unit that are built in the projector and receive light from a light source and output white light or receive image light and output color image light.

BACKGROUND ART

A projector described in Patent Literature 1 includes a rotatable phosphor wheel that excites light emitted from a light source and generates fluorescence. For example, laser light emitted from the laser light source enters a phosphor on a substrate of the wheel. In this manner, the phosphor generates color light. At least light having the generated color light enters a light modulation device, and image light is generated.

In the phosphor wheel described in Patent Literature 1, a heat sink is bonded to the substrate of the wheel in order to prevent the temperature of the phosphor from increasing due to laser light irradiation (e.g., see Specification paragraph [0033]).

CITATION LIST

Patent Literature

Patent Literature 1: Japanese Patent Application Laid-open No. 2012-8177

DISCLOSURE OF INVENTION

Technical Problem

In a case where the temperature of the substrate is increased due to the light irradiation, the substrate is thermally expanded and cracks may be generated in the substrate. In particular, a hole is provided at the center of the substrate for fixing a rotational shaft. Therefore, the stress is easily concentrated by the thermal expansion, and cracks are easily generated.

In view of the above-mentioned circumstances, it is an object of the present technology to provide a rotor that can prevent cracks from being generated, a rotor unit using the rotor, and a projector that includes the rotor unit.

Solution to Problem

A rotor unit according to the present technology includes a rotor including a substrate and a wavelength conversion region, and a driving unit.

The substrate includes an outer edge and is configured such that a substrate material is continuously provided from a center to the outer edge.

The wavelength conversion region is provided on the substrate and receives light having a first wavelength region and emits light having a second wavelength region different from the first wavelength region.

The driving unit rotates the rotor.

With this, even if heat is accumulated in the substrate, the heat can be uniformly diffused in the entire substrate material. In this manner, stress concentration caused by a hole provided in the substrate can be avoided. As a result, cracks can be prevented from generating.

The rotor unit may further include a fixing member that fixes a rotational shaft of the driving unit to the substrate.

With this, the substrate can be fixed to the rotational shaft via the fixing member irrespective of the shape of the rotational shaft. With this, the rotor can have a desirable fixing strength to the rotating motor.

The fixing member may include a surface and three or more seat surfaces provided on the surface. The rotor unit may further include an adhesive material interposed between the substrate held in contact with the three or more seat surfaces and the surface. By providing the surface of the fixing member with the three or more seat surfaces, rotation plane accuracy of the rotor can be improved. As a result, rotation balance is improved.

The fixing member may include a fitting hole in which the rotational shaft is fitted.

In a case where an outer diameter of the rotational shaft is small, the substrate can be fixed by using the fixing member having an outer diameter larger than the outer diameter of the rotational shaft so as to compensate it.

The fixing member may include one or more recesses provided to be opened toward the fitting hole around the rotational shaft fitted in the fitting hole.

By filling each recess with the adhesive material, the rotational shaft is bonded to the fixing member.

The recess may include a stair-like inner surface.

With this, an operator who assembles the wheel unit can easily grasp a filling amount of the adhesive material.

The fixing member may include an outer circumferential portion and a cut-out portion provided in the outer circumferential portion.

By providing the cut-out portion, the fixing member can be reduced in weight.

The seat surface may be provided to be rotational-symmetric about the rotational shaft as the center.

With this, the rotation balance is improved.

The plurality of recesses may be provided to be rotational-symmetric about the rotational shaft as the center.

With this, the rotation balance is improved.

The fixing member may include an outer circumferential portion and a plurality of cut-out portions provided in the outer circumferential portion. Arrangement and shape of the three or more seat surfaces and arrangement and shape of the plurality of cut-out portions may be designed to be line-symmetric with respect to a line passing through a center of rotation of the rotor along the surface of the fixing member.

With this, for example, when the balancer adjusts a balance, the left and right balance across the line is already adequately adjusted, which allows the balancer to easily adjust the rotation balance.

The rotor unit may further include a balancer provided on a side opposite to a side of the substrate of the rotor on which the rotational shaft of the driving unit is arranged.

With this, the rotation balance is improved.

The rotor unit may further include an affixing material that sticks the outer circumferential portion of the fixing member and the substrate to each other.

With this, the fixing strength of the substrate can be further improved by the fixing member.

A rotor according to the present technology includes the substrate and the wavelength conversion region as described above.

A projector according to the present technology includes a light source, the above-described rotor unit, a light modulation element, and a projection optical system.

The light modulation element modulates light emitted from the wavelength conversion region of the rotor.

The projection optical system projects modulation light obtained by modulation of the light modulation element.

Advantageous Effects of Invention

As described above, in accordance with the present technology, it is possible to prevent cracks from generating.

It should be noted that the effects described here are not necessarily limitative and may be any effect described in the present disclosure.

MODE(S) FOR CARRYING OUT THE INVENTION

Hereinafter, embodiments according to the present technology will be described with reference to the drawings.

[Wheel Unit]

Figure 1:
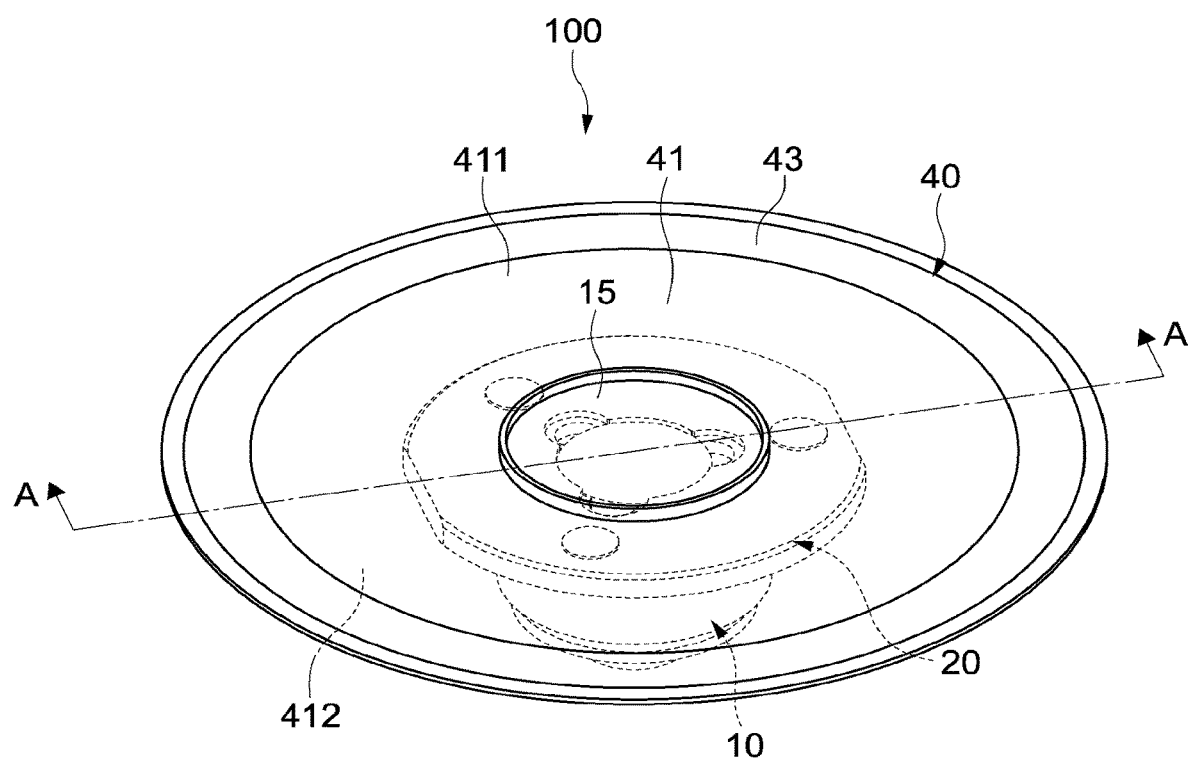
FIG. 1 is a perspective view showing a wheel unit according to an embodiment of the present technology.
Figure 2:
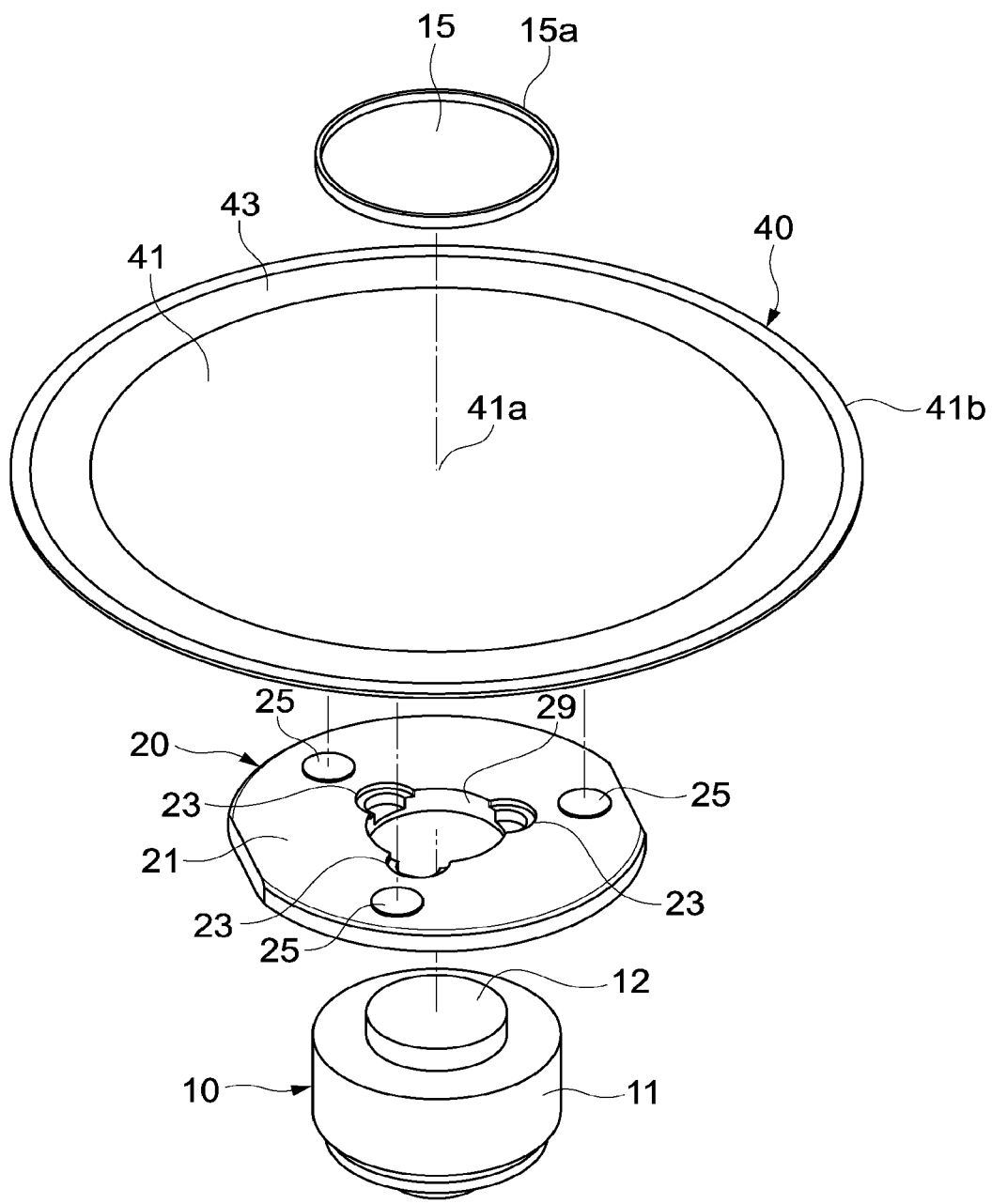
FIG. 2 is an exploded perspective view of the wheel unit shown in FIG. 1.
Figure 3:
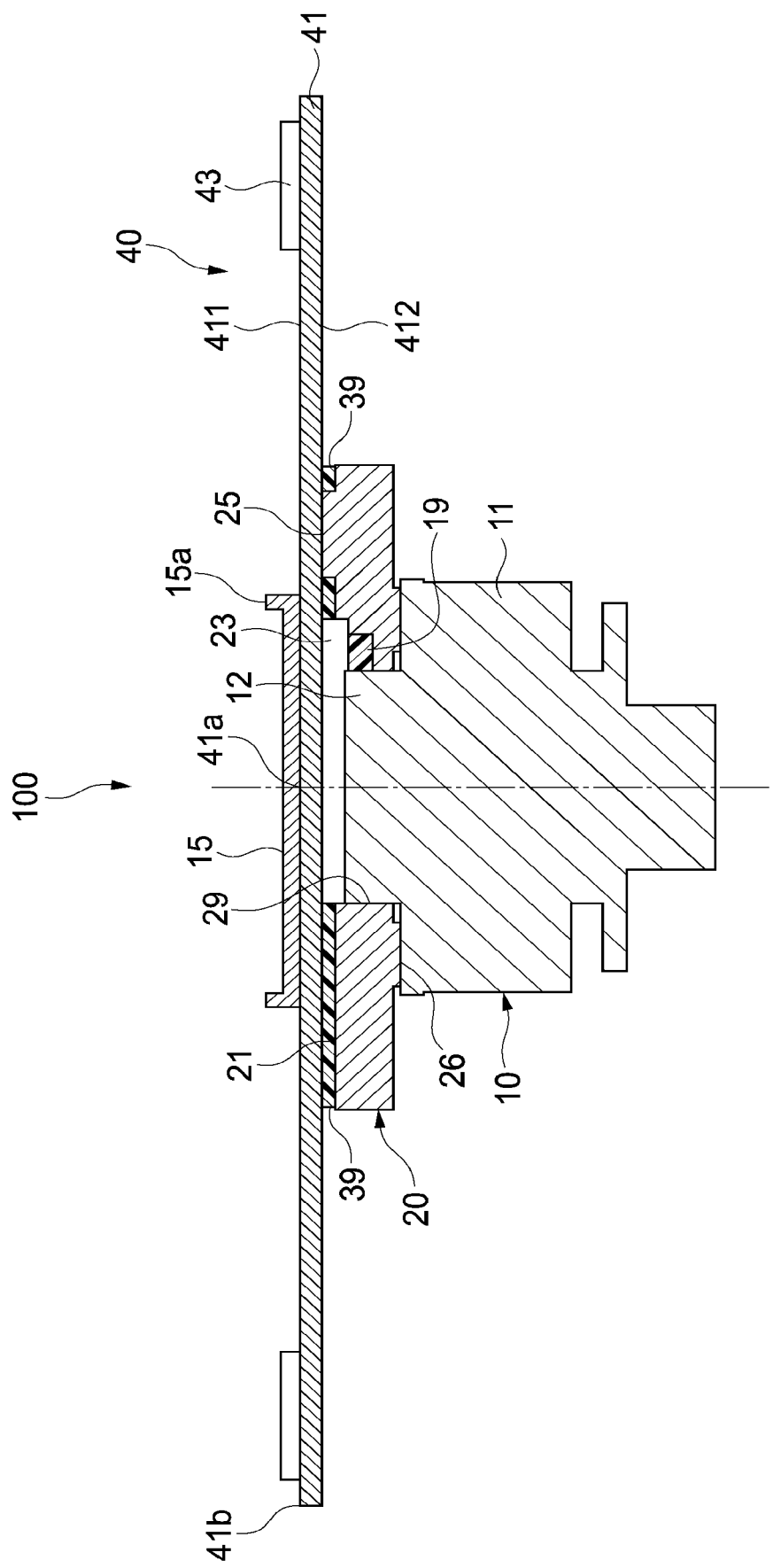
FIG. 3 is a sectional view taken along the line A-A of FIG. 1.

FIG. 1 is a perspective view showing a wheel unit as a rotor unit according to an embodiment of the present technology. FIG. 2 is an exploded perspective view of a wheel unit 100 shown in FIG. 1. FIG. 3 is a sectional view taken along the line A-A of FIG. 1. The wheel unit 100 is a unit including a wheel 40 of a light transmission type.

As shown in FIG. 1, the wheel unit 100 includes the wheel 40 as the rotor, a rotating motor 10 as a driving unit that rotationally drives the wheel 40, a fixing member 20 that fixes the wheel 40 and the rotating motor 10, and a balancer 15 provided on the wheel 40. Note that, in FIG. 3, an internal structure of the rotating motor 10 is shown with hatching, and is not shown.

(Configuration of Wheel)

The wheel 40 includes a substrate 41 and a phosphor 43 provided on the substrate 41 as a light wavelength conversion region. As a material of the substrate 41 (hereinafter, referred to as "substrate material"), a light transmissive material, for example, glass is used. As shown in FIGS. 2 and 3, the substrate 41 is configured such that the substrate material is continuously provided from a center 41a to an outer edge 41b of the substrate 41. That is, the substrate 41 has no hole for connection to the rotating motor 10 and/or a hub at the center. Typically, the hub is a member provided for connection of the rotating motor 10 to the wheel. Note that an outer shape of the substrate 41 is, for example, a circle, or may be a rotational-symmetric shape (e.g., regular polygon shape).

The phosphor 43 is provided in a ring shape in the surface of the substrate 41. The phosphor 43 is uniformly formed in a rotational direction of the wheel as a single member. Hereinafter, for the sake of description, the surface of the substrate 41 where the phosphor 43 is formed will be referred to as a first surface 411, and an opposite surface (where the rotating motor 10 is arranged) will be referred to as a second surface 412. Light (excitation light described later) enters the phosphor 43 from a light source (e.g., laser light source 2 shown in FIG. 7). The width of the phosphor 43 (width of the phosphor 43 in a radial direction of the substrate 41) is designed to be larger than the light beam diameter of the entering light. It is favorable that the phosphor 43 is arranged at a position closer to the outer edge 41b of the substrate 41 such that a total amount of phosphor 43 is increased or an amount of light entering the phosphor 43 is as low as possible for a unit time in order to prolong the life of the phosphor 43.

A main material of the phosphor 43 includes, for example, a fluorescent substance that is excited by the above-described excitation light and generates visible light of a longer wavelength region (second wavelength region) than a wavelength region (first wavelength region) of the excitation light. For example, the phosphor 43 includes a substance that is excited by blue laser light having a center wavelength of about 445 nm and emits fluorescence. The phosphor 43 converts part of blue laser light emitted from the light source into light having a wavelength region from a red wavelength region to a green wavelength region (i.e., yellow light) and emits the light. As such a fluorescent substance, YAG (yttrium.aluminum.garnet) based phosphor is used, for example.

Further, as the phosphor 43 absorbs part of the excitation light and transmits the remaining part of the excitation light, the phosphor 43 can emit blue laser light emitted from the light source. With this, the light emitted from the phosphor 43 is white light as a result of mixing blue excitation light with yellow fluorescence. Thus, in order to transmit part of the excitation light, the phosphor 43 may include filler particles that are particulate substances having, for example, light transmission properties.

Note that the wheel 40 in this embodiment is a light transmission type. As described later, arrangement of the light source and the wheel unit 100 are designed, for example, such that light enters from the light source on a second surface 412 side of the substrate 41. Thus, light enters the phosphor 43 from the second surface 412 side via the substrate material, and light is emitted from the first surface 411. Therefore, an antireflection film is desirably formed on the second surface 412 of the substrate 41 and/or between the phosphor 43 and the second surface 412.

(Configuration of Fixing Member)

Figure 4:
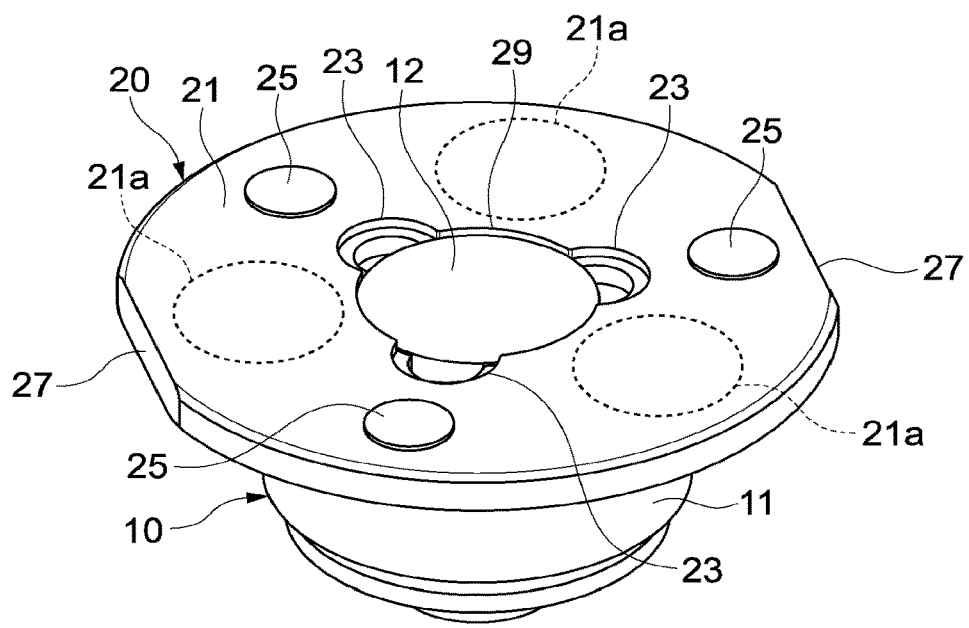
FIG. 4 shows a status in which a rotating motor and a fixing member are connected and fixed.

FIG. 4 shows a status in which the rotating motor 10 and the fixing member 20 are connected and fixed. Note that the rotating motor 10 includes a main body 11 and a rotational shaft 12.

The fixing member 20 has a substantially disc shape. The fixing member 20 functions as a spacer interposed between the rotational shaft 12 and the wheel 40 in order to increase fixing strength between the rotating motor 10 and the wheel 40. The fixing member 20 is made of resin or metal.

In this embodiment, in order to fix the fixing member 20 and the rotational shaft 12 of the rotating motor 10, an adhesive material (adhesive) is used. Thus, for example, in a case where the diameter of the rotational shaft 12 is too small to acquire the desirable fixing strength between the rotational shaft and the wheel 40, the fixing member 20 can provide a region that comes into contact with the wheel 40 at the position about a diameter larger than the diameter of the rotational shaft 12 (externally from the diameter of the rotational shaft 12). With this, the fixing strength of the wheel 40 to the rotating motor 10 may be increased.

Specifically, the fixing member 20 has a fitting hole 29 that is a through-hole at the center, into which the rotational shaft 12 of the rotating motor 10 is fitted. Further, the fixing member 20 has recesses 23 opened toward the fitting hole 29 around the rotational shaft 12 fitted into the fitting hole 29. In other words, the recesses 23 are in cutout shapes.

The number of recesses 23 may be one. In view of the rotation balance, the plurality of recesses 23 are provided. In this case, (arrangement and shape of) the recesses 23 are desirably provided in a rotational-symmetric manner. Only with the rotational shaft 12 being fitted into the fitting hole 29, the fixing member 20 and the rotational shaft 12 are fixed. The recesses 23 are filled with the adhesive material 19 (see FIG. 3), which is cured, resulting in the increased fixing strength. More detailed configurations of the recesses 23 will be described later.

The thickness of the fixing member 20 is substantially the same as or larger than the length of the rotational shaft 12 of the rotating motor 10 in an axial direction. However, these may not be the same.

As shown in FIGS. 3 and 4, the fixing member 20 has a main surface 21 as the surface, and three seat surfaces 25 provided on the main surface 21 and formed at the position higher than the main surface 21. The wheel 40 comes into contact with the three seat surfaces 25. Although each seat surface 25 has a circle shape, each seat surface 25 may have other shapes. The respective seat surfaces 25 are provided to be (arrangement and shape of) rotational-symmetric about the rotational shaft 12 as the center. In other words, the respective seat surfaces 25 have the same shape and the same size, for example, and are arranged at equal angular intervals and an equal radius with the rotational shaft 12 being a center. With this, the rotation balance is improved.

Assuming that an outer diameter of the wheel 40 is, for example, about 2 cm to 8 cm, the height of each seat surface 25 from the main surface 21 is about 0.1 mm to 1 mm.

As shown in FIG. 3, with the wheel 40 being mounted on the seat surfaces 25 of the fixing member 20, the adhesive material 39 is filled between the main surface 21 and the second surface 412 of the wheel 40, thereby bonding and fixing the fixing member 20 and the wheel 40. No adhesive material 39 is applied between the seat surface 25 and the fixing member 20. Note that the adhesive material 39 may not be applied on the entire region of the main surface 21, may be applied to a part of the main surface 21 (e.g., a plurality of regions 21*a* as shown in FIG. 4), and the wheel 40 may be thus fixed.

In a case where the substrate 41 comes into contact with and fixed to the surface of the fixing member 20 (in a case where no seat surface 25 is provided), rotation plane accuracy of the wheel 40 depends on flat plane accuracy of the surface of the fixing member 20. With higher rotation plane accuracy, the rotation plane may be rotated in one plane. Since the three seat surfaces 25 are provided to be rotational-symmetric on the surface of the fixing member 20, the flat plane accuracy of the fixing member 20 less affects the rotation plane accuracy of the wheel 40. In this manner, the rotation plane accuracy of the wheel 40 can be improved. As a result, the rotation balance is improved. In this manner, in order to improve the rotation plane accuracy, no adhesive material 39 is filled between the seat surface 25 and the wheel 40, and the adhesive material 39 is filled between a part or entire region of the main surface 21 and the wheel 40, as described above.

Although the number of seat surfaces 25 are three, four or more seat surfaces 25 may be provided as long as the rotation plane accuracy can be maintained. Also in a case where four or more seat surfaces 25 are provided, the respective seat surfaces 25 are desirably provided to be rotational-symmetric about the rotational shaft 12 as the center.

As shown in FIG. 4, a stair-like inner surface of each recess 23 of the fixing member 20 has two steps, for example. An inner diameter of a deeper step of each recess 23 is smaller than an inner diameter of a shallower step of each recess 23. With such a configuration, for example, the depth position corresponding to the first step on the way may be a guide of a filling amount (the position of the upper limit of the filling amount) of the adhesive material 39. With this, an operator who assembles the wheel unit 100 can easily grasp the filling amount of the adhesive material 39.

Cut-out portions 27 configured by cutting out circles are provided around a part of the outer circumferential portion of the fixing member 20. For example, the cut-out portion 27 is straightly cut out so as to provide flat side surfaces of the outer circumferential portion. This contributes to a reduction in weight of the fixing member 20.

A plurality of cut-out portions 27 are provided, for example, to be (arrangement and shape of) rotational-symmetric about the rotational shaft 12 as the center. In this embodiment, two cut-out portions 27 are provided about the rotational shaft 12 as the center at equal angular intervals, i.e., at 180-degree intervals. The number of cut-out portions 27 may be three or more. Also in this case, the cut-out portions 27 may be desirably arranged at equal angular intervals.

In this embodiment, the arrangement and the shape of the respective seat surfaces 25 and the arrangement and the shape of the plurality of cut-out portions 27 are designed to be line-symmetric with respect to a line (for example, the A-A line shown in FIG. 1) passing through the center of rotation of the wheel 40 along the surface of the fixing member 20. With this, when the balancer 15 adjusts balance as described next, the left and right balance across the line is already adequately adjusted, which allows the balancer 15 to easily adjust the rotation balance.

(Configuration of Balancer)

The balancer 15 has, for example, a substantially disc shape and has a structure, for example, of a plate having a side wall 15*a* at the outer circumferential portion. The shape of the balancer 15 is not limited thereto. The balancer 15 may have, for example, an outer shape of polygon or an overall shape of a ring (including a through-hole at the center). Alternatively, the balancer 15 may have an outer shape of polygon and a ring-shaped through-hole at the center. The side wall 15*a* may not be provided. The balancer 15 is made of metal or resin.

The balancer 15 is provided at the center of the first surface 411 that is the surface of the substrate 41 of the wheel 40, i.e., the surface opposite to the second surface 412 where the rotational shaft 12 is arranged. The balancer 15 and the substrate 41 are bonded and fixed with, for example, an adhesive material (not shown). When the wheel unit 100 is assembled, the arrangement of the balancer 15 is finely adjusted, and the rotation balance is thus adjusted.

Note that the rotation balance is adjusted by the balancer 15 after the wheel 40, the fixing member 20, and the rotating motor 10 are entirely assembled and fixed.

(Adhesive Material Around Fixing Member)

Figure 5:
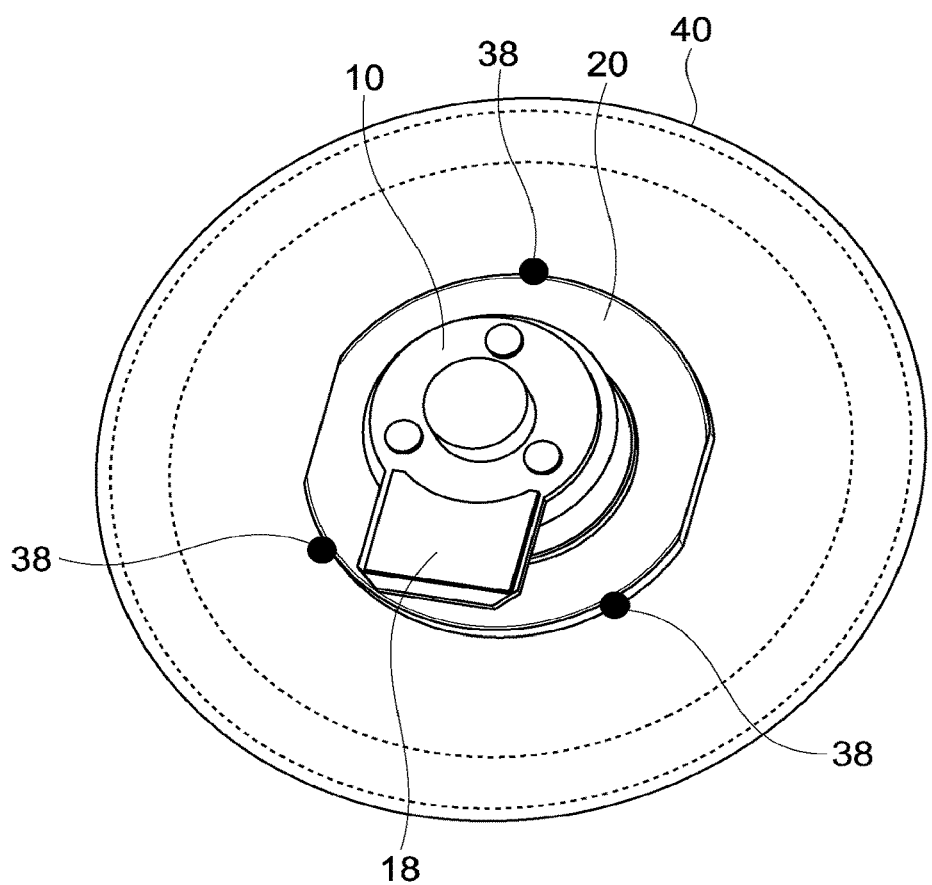
FIG. 5 is a view of the wheel unit as viewed from a substrate on a second surface side.

FIG. 5 is a view of the wheel unit 100 as viewed from the substrate 41 at the second surface 412 side. The affixing materials 38 are further attached to the outer circumferential portion of the fixing member 20. The affixing materials 38 further improve the fixing strength between the fixing member 20 and the wheel 40. As shown in FIG. 5, the affixing materials 38 are provided locally and rotational-symmetrically at the whole circumference of the fixing member 20 at a plurality of points. However, the affixing materials may be provided at the whole circumference of the fixing member 20. Although the affixing material is made of the same material as the adhesive material 19 and the adhesive material 39, the affixing material may be made of a different material. The adhesive material 19 may be different from the adhesive material 39.

Note that the member shown by a symbol 18 is a connector substrate that electrically connects a flexible printed wiring substrate (not shown) to the rotating motor 10.

(Center Axis Alignment of Fixing Member and Rotating Motor)

Figure 6:
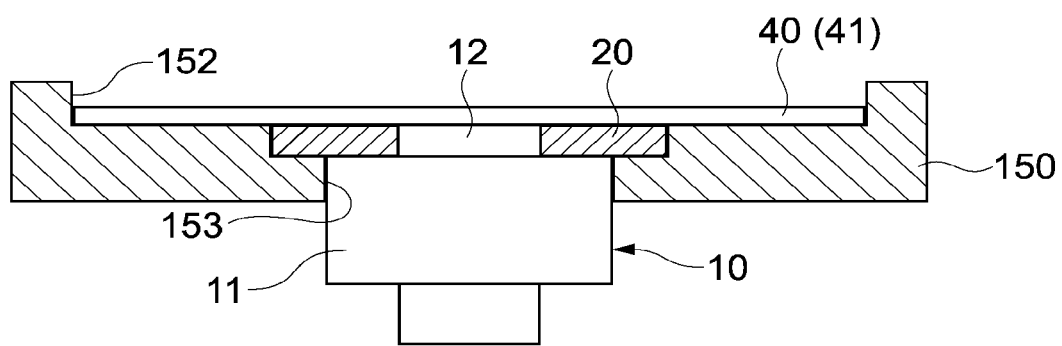
FIG. 6 is a sectional view showing a method of aligning center axes of the fixing member and the rotating motor using a jig.

FIG. 6 is a sectional view showing a method of aligning center axes of the fixing member 20 and the rotating motor 10 using a jig 150. The jig 150 includes a storage 152 having a shape corresponding to the shapes of the wheel 40 and the fixing member 20. Further, the jig 150 includes a through-hole 153 provided coaxially with the storage 152. The through-hole 153 has the shape corresponding to the main body 11 of the rotating motor 10. The wheel 40 and the fixing member 20 are bonded and fixed to the jig 150 such that the wheel 40 and the rotational shaft 12 of the rotating motor 10 are coaxial.

(Conclusion)

As described above, the substrate 41 of the wheel 40 according to this embodiment is configured such that the substrate material is continuously provided from the center to the outer edge 41b. That is, the substrate 41 has no hole. Even if heat is accumulated in the substrate 41, the heat can be uniformly diffused in the entire substrate material. With this, stress concentration can be avoided, and cracks can be prevented from generating.

Further, according to this embodiment, no heat sink described in Patent Literature 1 is necessary, and the rotating member can be reduced in weight.

Since the wheel unit 100 according to this embodiment includes the fixing member 20, the substrate 41 can be fixed to the rotational shaft 12 via the fixing member 20 irrespective of the shape of the rotational shaft 12 of the rotating motor 10. Thus, the wheel 40 can have desirable fixing strength to the rotating motor 10.

[Projector]

Figure 7:
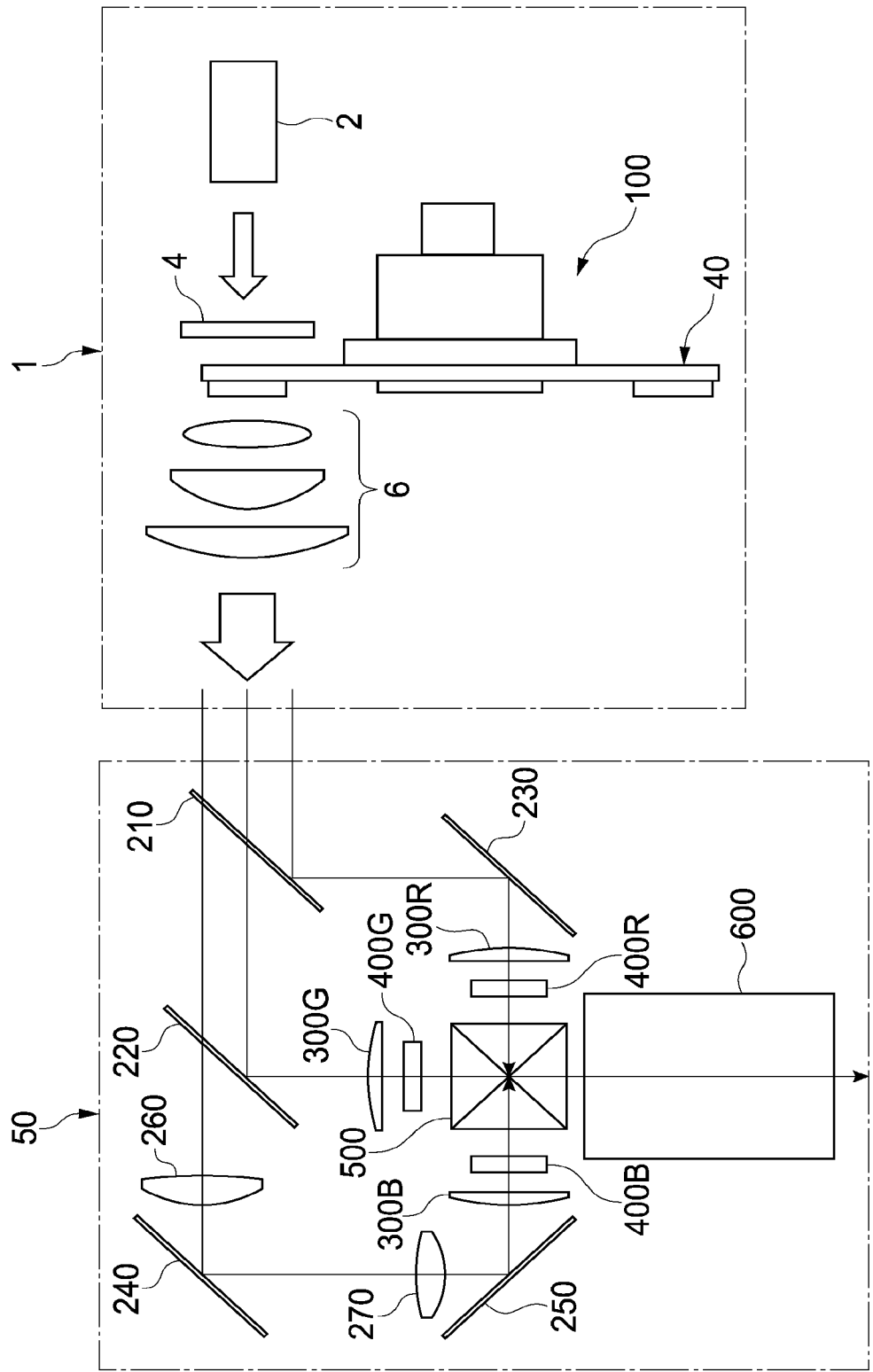
FIG. 7 shows a configuration of an optical system of a projector adopting the above-described wheel unit.

FIG. 7 shows a configuration of an optical system of a projector adopting the above-described wheel unit 100. The projector includes a light source unit 1 including the wheel unit 100 and an optical engine 50 that generates image light using light emitted from the light source unit 1.

(Configuration of Light Source Unit)

The light source unit 1 includes the laser light source 2, a diffuser 4, the wheel unit 100, and a light collecting optical system 6. The diffuser 4 has a function to diffuse laser light from the laser light source 2. The light collecting optical system 6 is constituted of a plurality of lenses, for example.

Instead of the laser light source 2, an LED light source may be provided, for example. In this case, an optical system is provided to collect light from the LED light source on the phosphor 43 of the wheel 40.

(Configuration of Optical Engine)

The optical engine 50 includes dichroic mirrors 210 and 220, mirrors 230, 240, and 250, relay lenses 260 and 270, field lenses 300R, 300G, and 300B, liquid-crystal light valves 400R, 400G, and 400B as light modulation elements, a dichroic prism 500, and a projection optical system 600.

The dichroic mirrors 210 and 220 have properties that selectively reflect color light of a predetermined wavelength region and transmit light of other wavelength regions. For example, the dichroic mirror 210 selectively reflects red light. The dichroic mirror 220 selectively reflects green light of green light and blue light transmitted through the dichroic mirror 210. The remaining blue light is transmitted through the dichroic mirror 220. With this, the light emitted from the light source unit 1 is separated into light beams having a plurality of different colors.

The red light reflected by the dichroic mirror 210 is reflected by the mirror 230, is collimated by passing through a field lens 300R, and then enters a liquid-crystal light valve 400R for modulating the red light. The green light reflected by the dichroic mirror 220 is collimated by passing through the field lens 300G, and then enters a liquid-crystal light valve 400G for modulating the green light. The blue light transmitted through the dichroic mirror 220 passes through the relay lens 260, is reflected by the mirror 240, further passes through the relay lens 270, and is reflected by the mirror 250. The blue light reflected by the mirror 250 is collimated by passing through a field lens 300B, and then enters a liquid-crystal light valve 400B for modulating the blue light.

The liquid-crystal light valves 400R, 400G, and 400B are electrically connected to a signal source (not shown) (e.g., PC) that feeds an image signal including image information. The liquid-crystal light valves 400R, 400G, and 400B modulate the entering light for each pixel on the basis of an image signal of each color, and generate a red image, a green image, and a blue image, respectively. The image light of each color obtained by the modulation (modulation light) enters the dichroic prism 500 and is combined. The dichroic prism 500 overlaps and combines the light beams of the respective colors entering in three directions, and emits the light to the projection optical system 600.

The projection optical system 600 irradiates the combined light by the dichroic prism 500 to a screen (not shown). With this, a full color image is displayed.

[Various Other Embodiments]

The present technology is not limited to the above-described embodiments, and various other embodiments may be realized.

Although the rotational shaft 12 and the fixing member 20 of the rotating motor 10 according to the above-mentioned embodiment are separated components, these may be one (integrated) component.

Figure 8:
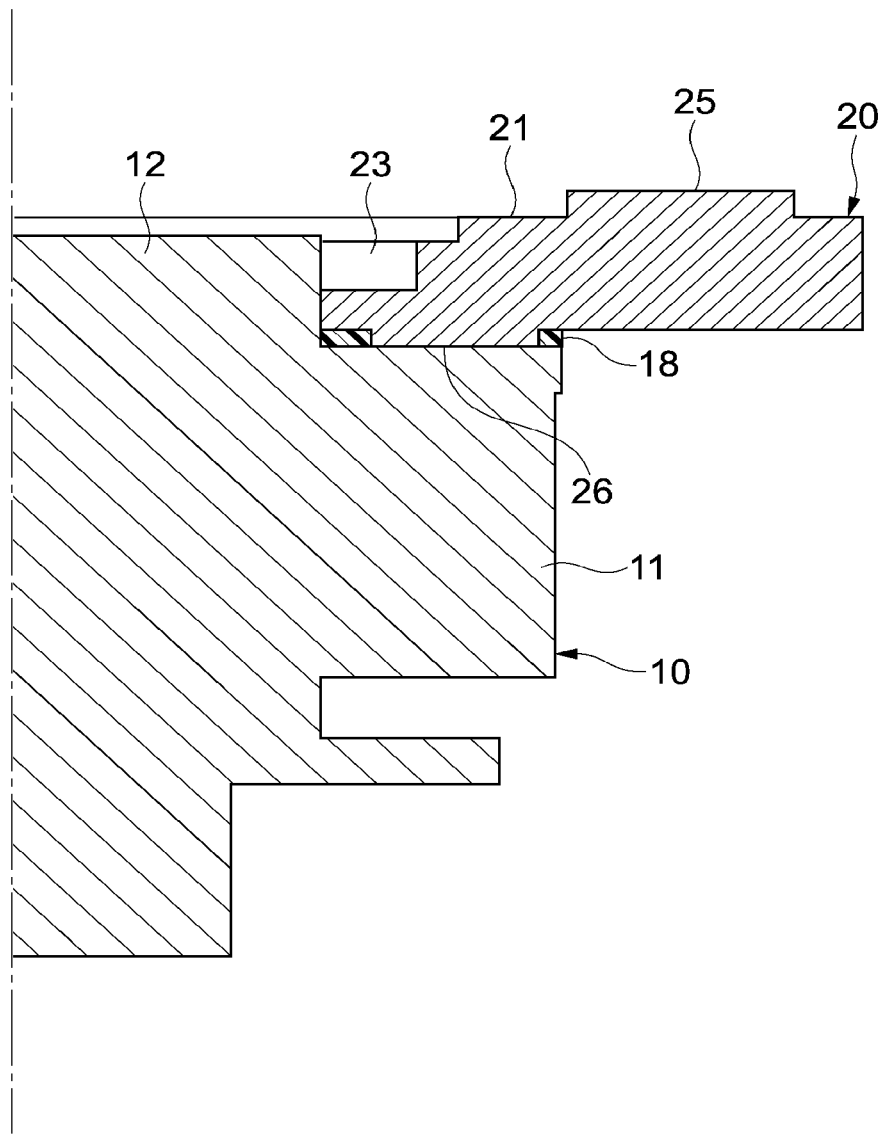
FIG. 8 shows another embodiment that a position of an adhesive material where the rotating motor and the fixing member are fixed.

FIG. 8 shows another embodiment of the position of the adhesive material where the rotating motor 10 and the fixing member 20 are fixed. In this embodiment, the adhesive material 18 is provided between a part or entire region of one of the front and rear surfaces of the fixing member 20 arranged at a rotating motor 10 side and the rotating motor 10, bonds and fixes the both. As a matter of course, such an embodiment may be combined with the embodiment that the adhesive material 19 is filled into the recesses 23 (see FIG. 3).

Note that the fixing member 20 includes a seat surface 26 having the same functions as the seat surface 25 on the surface in contact with the rotating motor 10, and the adhesive material 18 is not applied to the seat surface 26. It is desirable that the fixing member 20 in the above-mentioned embodiment have the seat surface 26 (see FIG. 3).

In the above-mentioned embodiment, the wheel 40 is fixed to the fixing member 20 with the adhesive material 39. Alternatively, a convex portion or a concave portion may be provided in the fixing member 20, and a concave portion or a convex portion, which are engaged with the convex portion or the concave portion of the fixing member 20, may be provided on the substrate 41 of the wheel 40, thereby fixing the fixing member 20 to the wheel 40. In addition to such a configuration, the adhesive material may be used to improve the fixing strength.

Although the fitting hole 29 of the fixing member 20 according to the above-mentioned embodiment is the through-hole penetrating through this member, the fitting hole 29 may be a concave portion not penetrating therethrough. In this case, one or more concave portions may be formed at the side where the rotating motor 10 is arranged.

In a case where no fine adjustment of the rotation balance of the wheel is necessary or the rotation balance is adequate with no balancer 15, the balancer 15 is unnecessary.

In the above-mentioned embodiment, although the substrate 41 of the wheel 40 is of a light transmission type, the substrate 41 of the wheel 40 may be of a reflection type.

A liquid crystal element is used as the light modulation element of the projector according to the above-mentioned embodiment. Alternatively, a DMD (Digital Micro-mirror Device) may be used.

The wavelength conversion region provided at the wheel 40 may be not only the phosphor 43, but also a color filter used for a color wheel.

At least two of the features of the above-mentioned embodiments can also be combined.

It should be noted that the present technology can also take the following configurations.

(1) A rotor unit, including:
  a rotor including
    a substrate that includes an outer edge and is configured such that a substrate material is continuously provided from a center to the outer edge, and
    a wavelength conversion region that is provided on the substrate and receives light having a first wavelength region and emits light having a second wavelength region different from the first wavelength region; and
  a driving unit that rotates the rotor.

(2) The rotor unit according to (1), further including
  a fixing member that fixes a rotational shaft of the driving unit to the substrate.

(3) The rotor unit according to (2), in which
  the fixing member includes a surface and three or more seat surfaces provided on the surface, the rotor unit further including
  an adhesive material interposed between the substrate held in contact with the three or more seat surfaces and the surface.

(4) The rotor unit according to (2), in which
  the fixing member includes a fitting hole in which the rotational shaft is fitted.

(5) The rotor unit according to (4), in which
  the fixing member includes one or more recesses provided to be opened toward the fitting hole around the rotational shaft fitted in the fitting hole.

(6) The rotor unit according to (5), in which
  the recess includes a stair-like inner surface.

(7) The rotor unit according to any one of (2) to (6), in which
  the fixing member includes an outer circumferential portion and a cut-out portion provided in the outer circumferential portion.

(8) The rotor unit according to (3), in which
  the seat surface is provided to be rotational-symmetric about the rotational shaft as the center.

(9) The rotor unit according to (5) or (6), in which
  the plurality of recesses are provided to be rotational-symmetric about the rotational shaft as the center.

(10) The rotor unit according to (3), in which
  the fixing member includes an outer circumferential portion and a plurality of cut-out portions provided in the outer circumferential portion, and
  arrangement and shape of the three or more seat surfaces and arrangement and shape of the plurality of cut-out portions are designed to be line-symmetric with respect to a line passing through a center of rotation of the rotor along the surface of the fixing member.

(11) The rotor unit according to any one of (1) to (10), further including
  a balancer provided on a side opposite to a side of the substrate of the rotor on which the rotational shaft of the driving unit is arranged.

(12) The rotor unit according to (2), further including
  an affixing material that sticks the outer circumferential portion of the fixing member and the substrate to each other.

(13) A rotor, including:
  a substrate that includes an outer edge and is configured such that a substrate material is continuously provided from a center to the outer edge; and
  a wavelength conversion region that is provided on the substrate and receives light having a first wavelength region and emits light having a second wavelength region different from the first wavelength region.

(14) A projector, including:
  a light source;
  a rotor including
    a substrate that includes an outer circumferential edge and is configured such that a substrate material is continuously provided from a center to the outer circumferential edge, and
    a wavelength conversion region that is provided on the substrate and receives light having a first wavelength region from the light source and emits light having a second wavelength region different from the first wavelength region;
  a driving unit that rotates the rotor;
  a light modulation element that modulates light emitted from the wavelength conversion region of the rotor; and
  a projection optical system that projects modulation light obtained by modulation of the light modulation element.

REFERENCE SIGNS LIST

1 . . . light source unit
2 . . . laser light source
10 . . . rotating motor
11 . . . main body
12 . . . rotational shaft
15 . . . balancer
20 . . . fixing member
21 . . . main surface
23 . . . recess
25 . . . seat surface 27 . . . cut-out portion
29 . . . fitting hole
38 . . . affixing material
39 . . . adhesive material
41 . . . substrate
41a . . . center
41b . . . outer circumferential edge
43 . . . phosphor
100 . . . wheel unit
150 . . . jig
400R, 400G, 400B . . . liquid-crystal light valve
600 . . . projection optical system

The invention claimed is:

1. A rotor unit, comprising:
a rotor including
   a substrate that includes an outer edge and is configured such that a substrate material is continuously provided from a center to the outer edge, and
   a wavelength conversion region that is provided on the substrate and receives light having a first wavelength region and emits light having a second wavelength region different from the first wavelength region;
a driving unit that rotates the rotor;
a fixing member that fixes a rotational shaft of the driving unit to the substrate, the fixing member including a surface and three or more seat surfaces provided on the surface so as to project above the surface; and
an adhesive material interposed between the substrate and the surface,
wherein a bottom surface of the substrate is held in direct contact with a planar top surface of the three or more seat surfaces such that at least an area without adhesive material is interposed between the planar top surface of the three or more seat surfaces and the bottom surface of the substrate.

2. The rotor unit according to claim 1, wherein the fixing member includes a fitting hole in which the rotational shaft is fitted.

3. The rotor unit according to claim 2, wherein the fixing member includes one or more recesses provided to be opened toward the fitting hole around the rotational shaft fitted in the filling hole.

4. The rotor unit according to claim 3, wherein the recess includes a stair shaped inner surface.

5. The rotor unit according to claim 3, wherein the one or more recesses are provided to be rotational-symmetric about the rotational shaft as the center.

6. The rotor unit according to claim 1, wherein the fixing member includes an outer circumferential portion and a cut-out portion provided in the outer circumferential portion.

7. The rotor unit according to claim 1, wherein the seat surface is provided to be rotational-symmetric about the rotational shaft as the center.

8. The rotor unit according to claim 1, wherein the fixing member includes an outer circumferential portion and a plurality of cut-out portions provided in the outer circumferential portion, and arrangement and shape of the three or more seat surfaces and arrangement and shape of the plurality of cut-out portions are designed to be line-symmetric with respect to a line passing through a center of rotation of the rotor along the surface of the fixing member.

9. The rotor unit according to claim 1, further comprising a balancer provided on a side opposite to a side of the substrate of the rotor on which the rotational shaft of the driving unit is arranged.

10. The rotor unit according to claim 1, further comprising an affixing material that sticks the outer circumferential portion of the fixing member and the substrate to each other.

11. A projector, comprising:
a light source;
a rotor including
   a substrate that includes an outer circumferential edge and is configured such that a substrate material is continuously provided from a center to the outer circumferential edge, and
   a wavelength conversion region that is provided on the substrate and receives light having a first wavelength region from the light source and emits light having a second wavelength region different from the first wavelength region;
a driving unit that rotates the rotor;
a fixing member that fixes a rotational shaft of the driving unit to the substrate, the fixing member including a surface and three or more seat surfaces provided on the surface so as to project above the surface;
an adhesive material interposed between the substrate and the surface;
a light modulation element that modulates light emitted from the wavelength conversion region of the rotor; and
a projection optical system that projects modulation light obtained by modulation of the light modulation element,
wherein a bottom surface of the substrate is held in direct contact with a planar top surface of the three or more seat surfaces such that at least an area without adhesive material is interposed between the planar top surface of the three or more seat surfaces and the bottom surface of the substrate.

* * * * *